United States Patent [19]
Garrison et al.

[11] 4,087,815
[45] May 2, 1978

[54] HYBRID DIGITAL-OPTICAL RADAR SIGNAL PROCESSOR

[75] Inventors: John B. Garrison, Silver Spring; James L. Queen, Bethesda; David G. Grant, Laurel, all of Md.

[73] Assignee: The United States of America as represented by the Secretary of the Navy, Washington, D.C.

[21] Appl. No.: 815,535

[22] Filed: Apr. 10, 1969

[51] Int. Cl.² .............................................. G01S 9/44
[52] U.S. Cl. ................................... 343/9; 343/100 CL
[58] Field of Search ................ 343/5 R, 8, 9, 100 CL; 235/181; 350/DIG. 1

[56] References Cited

U.S. PATENT DOCUMENTS

| | | | |
|---|---|---|---|
| 3,178,708 | 4/1965 | Kuck | 343/9 X |
| 3,220,003 | 11/1965 | Montague et al. | 343/5 X |
| 3,398,269 | 8/1968 | Williams | 343/100.7 X |
| 3,479,494 | 11/1969 | Wilmotte | 235/181 |
| 3,509,565 | 4/1970 | Wilmotte | 343/8 X |

Primary Examiner—T.H. Tubbesing

[57] ABSTRACT

A hybrid digital-optical radar signal processor utilizing electro-optic crystals and having no moving parts. The processor is used with a radar having multiple discrete evenly spaced transmit frequencies, generated in a pattern, and is capable of simultaneously processing information relating to multiple targets. In the receiver section of the radar electro-optic crystals, such as Lithium Tantalate (LiTaO₃), act as optical phase shifters and are arranged in a data plane which is illuminated by a CW laser. Provision is made in digital delays and the optical phase shifters to provide flexibility in the selection of the pattern of frequency utilization during the transmit period. The optical output of the processor consists of an illumination pattern in a read-out plane with maximum intensity in said plane at positions corresponding to the velocity and fine range of each target.

16 Claims, 5 Drawing Figures

HYBRID DIGITAL-OPTICAL RADAR SIGNAL PROCESSOR

BACKGROUND AND OBJECTS OF THE INVENTION

The present invention relates to a hybrid digital-optical radar signal processor which is designed for use with a radar having multiple transmit frequencies and an associated multi-channel search receiver.

Because of the Fourier Transform properties of a lens, signal processors using coherent optical correlators possess a potentially significant advantage in size and cost as compared to their electronic counterparts. This is particularly true for coherent signal processing whenever multi-channel or two dimensional correlations are involved. Recent emphasis in optical computing has been placed upon either film processors or ultrasonic modulators. Both of these approaches have deficiencies when considered for a real time radar environment. The film type processors are too slow. The Ultrasonic modulators do possess adequate speed but have other limitations which adversely affect overall system flexibility. Specifically, signal delay accomplished by propagation in the ultrasonic medium is limited to about 100 microseconds. This limits the integration time accordingly. In addition, changes in pulse width and pulse separation cannot be effected over a substantial range, which limits the choice of possible transmit waveforms. Finally, unless auxiliary means are used, signals transduced into the ultrasonic medium are lost.

The principal object of the present invention, therefore, is to provide a hybrid digital-optical radar signal processor which will take advantage of the benefits of an optical processor while retaining the flexibility of a digital system.

Another important object is to provide a signal processor which uses no moving parts and which, therefore, has high mechanical stability and no substantial registration problems.

A further object of the invention resides in the provision of a signal processor which does not involve difficult control techniques or the use of dangerous materials.

As still another object the invention provides a hybrid digital-optical radar signal processor which may be packaged into a compact, rugged assembly and which will therefore be reliable in operation.

Other objects and advantages of the invention will be readily appreciated as the description thereof proceeds.

GENERAL DESCRIPTION OF THE INVENTION

The purpose of the data processor of the present invention is to accept pulse data as it is produced by the radar search receiver and process it to obtain simultaneously both doppler and fine range as well as phase angle comparisons between channels when required. Each pulse of data is stored and used to change the path of coherent light from a CW laser through electro-optic crystals to a lens system and readout plane.

The instant processor is based on a radar utilizing 100 transmit frequencies evenly spaced across a 50 MHz band. The transmit period is of 200 microsecond duration subdivided into 100 two microsecond intervals. Each of the 100 frequencies will be used only once during the transmit period. The digital delays and optical phase shifter employed permit flexibility in the selection of the pattern of frequency utilization during the transmit period, the transmit pattern, generated in the frequency generator-synchronizer sections of the radar, being compatible with the acceptable patterns in the optical processor section of the invention. The receiver section of the radar will process 100 frequency channels simultaneously and provide as outputs an inphase (I) and quadrature (Q) pair of bipolar video signals for each frequency channel to digital input circuits. Phase decoding is aided by phase shifting of a reference local oscillator.

The optical output of the data processor consists of an illumination pattern in the readout plane with maximum intensity at a position in said plane, if a coherent return from a radar target is present, corresponding to the velocity and fine range of the target. The illumination pattern will change at 2 microsecond intervals, corresponding to the sequential examination of coarse range bins, a detection search in range and Doppler of the readout plane being made in each said interval. The 2 microsecond interval during which a detection threshold is exceeded will produce the coarse range of the target to which must be added the fine range as determined by the position of the return on the range axis of the readout plane.

DETAILED DESCRIPTION OF THE INVENTION

Figure 1:
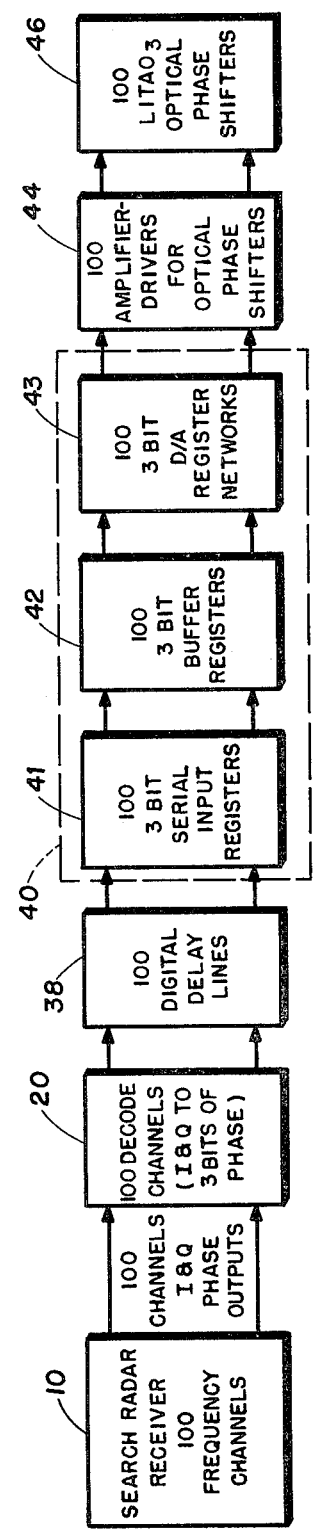
FIG. 1 is a block diagram of the processor of the present invention, shown for processing 100 channels.
Figure 2:
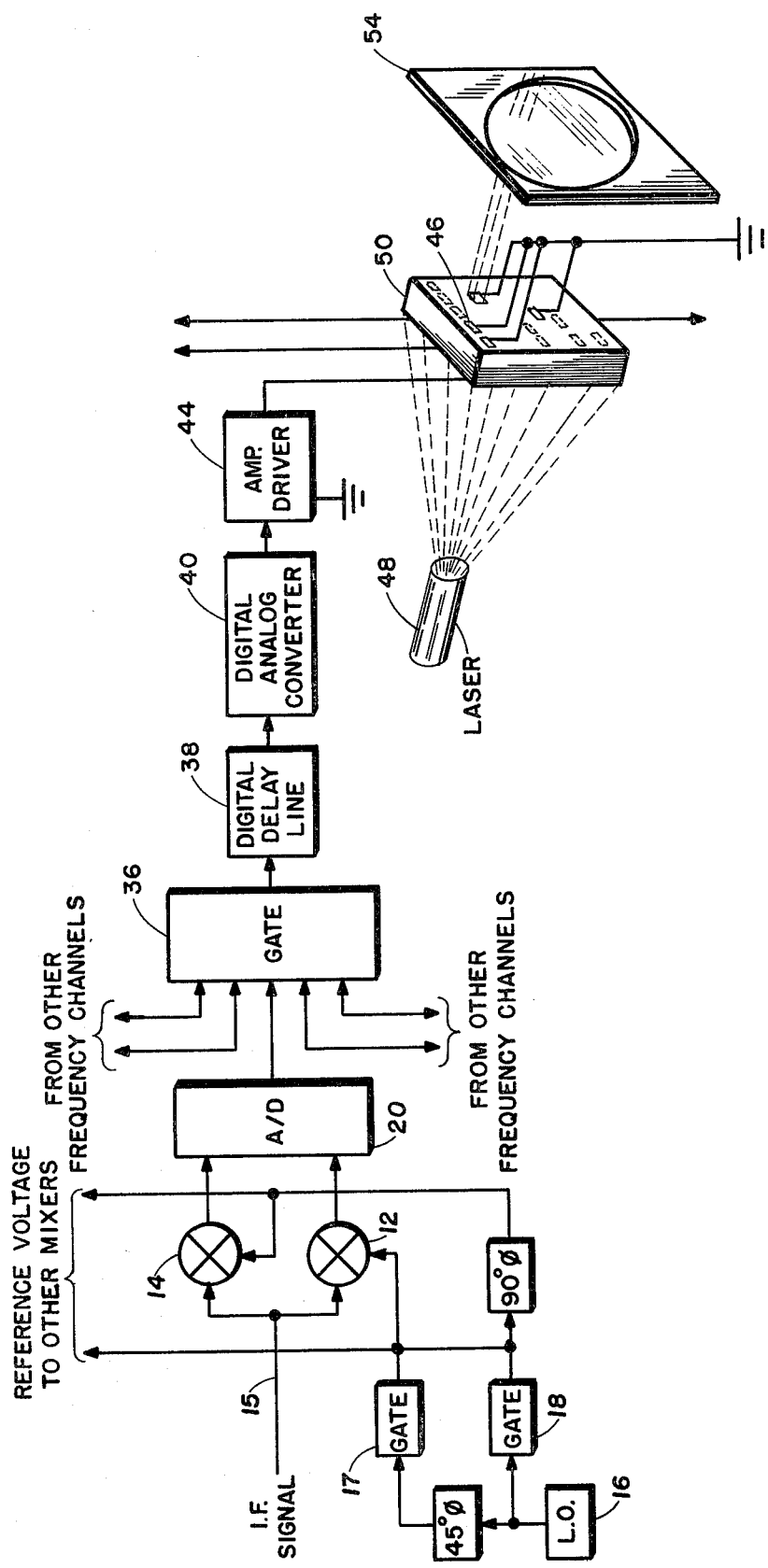
FIG. 2 is a more detailed block diagram showing the arrangement of components for processing three signal channels, but without the readout optical section.

Referring to the drawings, and first to the block diagrams of FIG. 1, a search radar receiver capable of providing a 100 channel output is shown at 10. For each channel, as shown in FIG. 2, there are provided inphase (I), and quadrature (Q) mixers 12 and 14 which are fed by the intermediate frequency (IF) signal output 15 for that channel. A reference signal from a local oscillator 16 is phase shifted 45° and supplied to the (I) mixer 12 via a gate 17. The reference signal is also phase shifted 90° and supplied to the (Q) mixer 14 via a gate 18. The bipolar video signals (I) and (Q) from each channel are decoded into a three bit digital representation of phase modulo $2\pi$ by a phase decoder 20. The three bit output of the decoder 20 will be serial and in time synchronism with suitable delay clocks (not shown). A part of the decoding function will be accomplished by switching the phase of the reference voltage to the I and Q mixers by 45° at the appropriate time.

Figure 4:
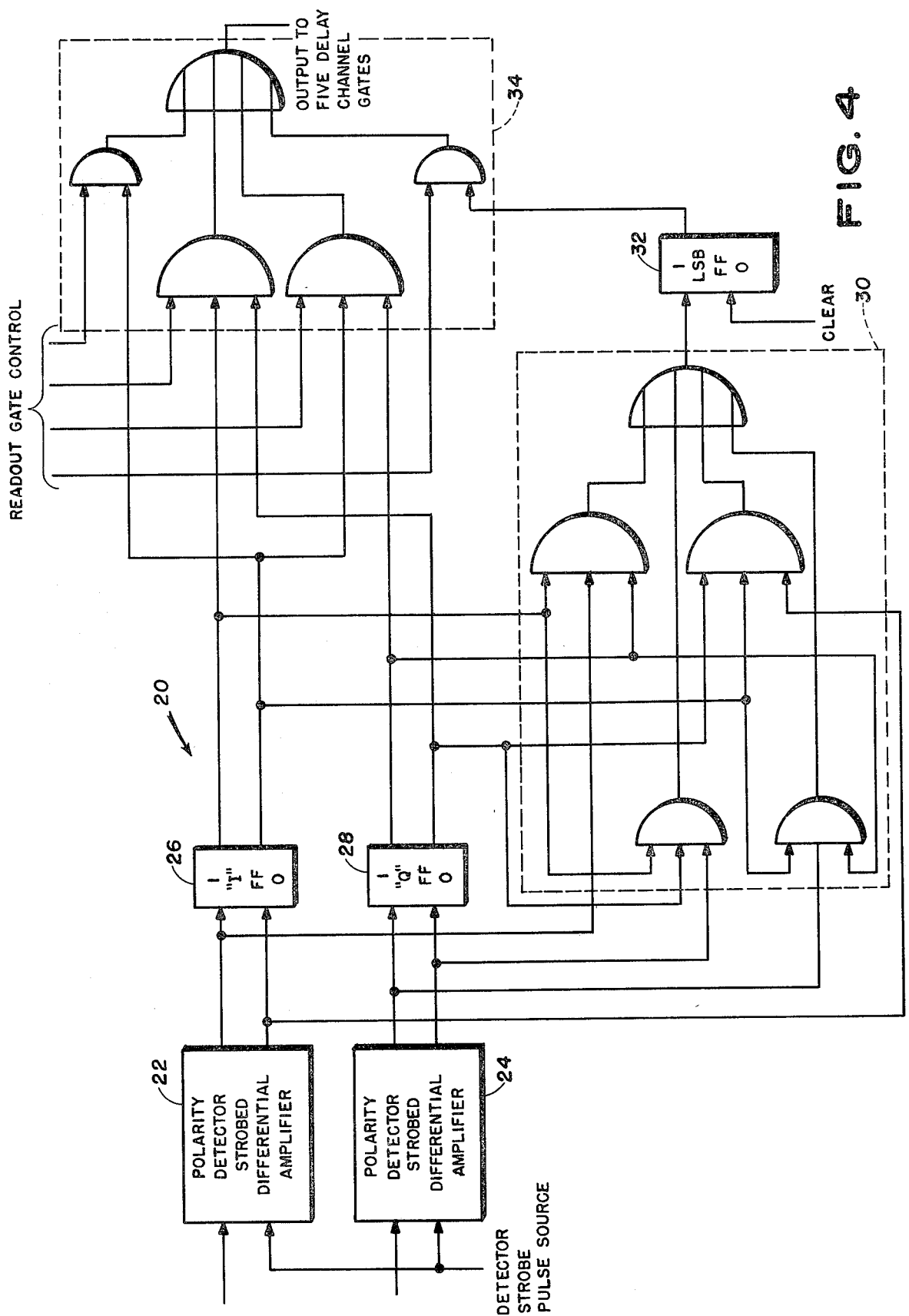
FIG. 4 is a schematic view showing the phase decode circuits.

The decoder 20 is shown in FIG. 4 and may be described as follows: Since the radar transmission on any given frequency is of 2 microseconds duration, the output of each frequency channel, e.g., the channel shown in FIG. 2, will be sampled at 2 microsecond intervals. This sample will be split into two phases, separated by 0.25 microsecond. The first phase sample will provide an inphase ("I") and quadrature ("Q") polarity sense with respect to a zero reference phase by polarity detectors 22 and 24. These outputs will be stored temporarily in "I" and "Q" flip-flops 26 and 28. The second phase sample will provide an "$I_1$" and "$Q_1$" polarity sense with respect to the reference phase shifted by 45° from the first phase sample. The "$I_1$" and "$Q_1$" signals, combined with "I" and "Q" through appropriate logic 30, will determine the Least Significant Bit (LSB) of phase, which is stored in LSB flip-flop 32. The "I" and "Q" and LSB flip-flop outputs are then gated sequentially through output gating logic 34 to form a serial 3 bit phase code on a single output line. This output is available to the input gating circuits of five delay channels, e.g., the gate 36 shown in FIG. 2.

The output of the gate 36 is connected to a digital delay line 38. The delay line may be an ultrasonic digital delay line package such as that manufactured by Computer Control Company, Inc., Model SM32. If desired, microelectronic shift registers may be used for delay and storage. Each channel, e.g., the channel shown in FIG. 2, will include one such delay line package. The 100 delay channels (FIG. 1) may be conveniently numbered 1 through 100, with the channel number representing the channel delay in 2 microsecond units. The digital delay line units 38 are each provided with four input gates and with provision for additional inputs. Thus the steering of the appropriate frequency channel (one of five) into the appropriate delay line can be accomplished by the addition of one 2-input "and" gate to the input of each delay line unit. The delay line units 38 will be clocked at a 1.5 MHz rate, to provide 3 bits of storage for each 2 microsecond interval.

As shown in FIG. 1, the outputs of the delay line units 38 feed a digital/analog converter 40 which consists of 3 bit serial input registers 41, 3 bit buffer registers 42, and digital/analog register networks 43. The converter 40 provides driving voltages for driver amplifiers 44 for the optical phase shifter 46, to be described hereinafter.

The driver amplifiers 44 each consist of a transistorized linear amplifier which is capable of driving its associated optical phase shifter element 46 with a voltage sufficient to provide 360° of differential optical phase delay in said element and with a rise time of less than 0.25 microsecond. Rapid rise time is necessary to provide the maximum amount of time for search of the readout data plane.

Figure 3:
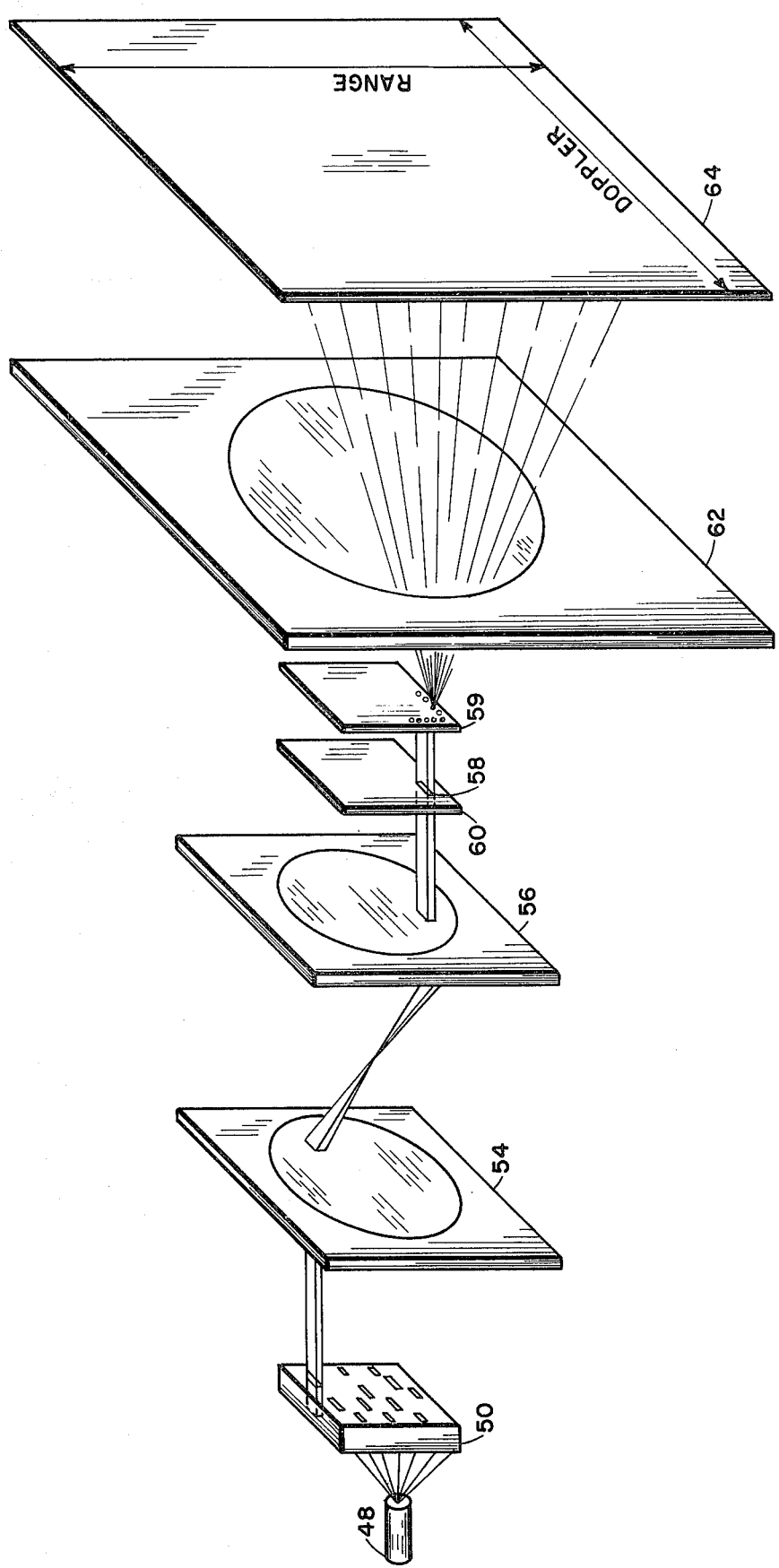
FIG. 3 is a schematic view showing the readout optical section of the invention.

The optical system of the invention will now be described. In FIGS. 2 and 3 there is shown a laser 48 which illuminates a data plane, comprised of a phase shifter unit 50, with a plane wavefront of plane polarized monochromatic light. The data plane will pass 100 parallel beams, one through each of 100 crystal phase shifter elements 46 mounted in the unit 50. The phase shifter elements 46 are preferably formed of Lithium Tantalate, although other materials, such as Potassium Tantalum Niobate, may be used if desired. By way of example, in the single channel shown in FIG. 2, the driver amplifier 44 has its output connected to one of the phase shifter elements 46. Each of the other 99 channels is similarly connected to a phase shifter element in the data plane.

As best seen in FIG. 3, the laser beam passing through the crystal phase shifter element is focussed, by focussing lenses 54 and 56, upon a masking phase shifter element 58 which is one of 100 such elements mounted in a masking phase shifter unit 60. From the masking phase shifter element 58 the laser beam passes through an aperture plate 59 to a readout lens 62 and through said lens to a readout plane 64.

From the above it will be understood that each of the 100 parallel beams will have applied thereto a relative phase shift in accordance with the input data. The 100 parallel beams are focussed upon the masking phase shifter unit 60 by the lenses 54 and 56, each beam having a masking phase shifter element, e.g., one of the element 58, associated therewith. The masking phase shifter elements are used to select one of five frequency positions from each beam. The resulting beams are passed on to the readout optics, consisting of the readout lens 62 and readout plane 64.

As stated hereinabove, the phase shifter unit 50 which comprises the data plane consists of 100 phase shifter elements 52. These elements are distributed over the area of the plane in such a manner that there is one element for each time position. Since each phase shifter covers five adjacent frequency positions, the distribution is such that each frequency position can be utilized in any one of five time positions.

Additional optics can be employed following the readout lens to reimage the data plane and increase the effective displacements with a given optical path length.

Thresholding, detection, and position determination of the integrated output in the readout plane is required. Since the input pulse width is 2 microseconds and the optical phase shifters will require approximately 0.5 microsecond to stabilize for each set of data, the readout plane must be searched in 1.5 microseconds. Between 1000 and 10,000 readout data points which may have to be examined. Examination of these readout positions sequentially would require an extremely fast detector response (0.1 to 1.0 nanosec.). Parallel detection in the readout plane would pose problems with respect to threshold uniformity and stability.

Figure 5:
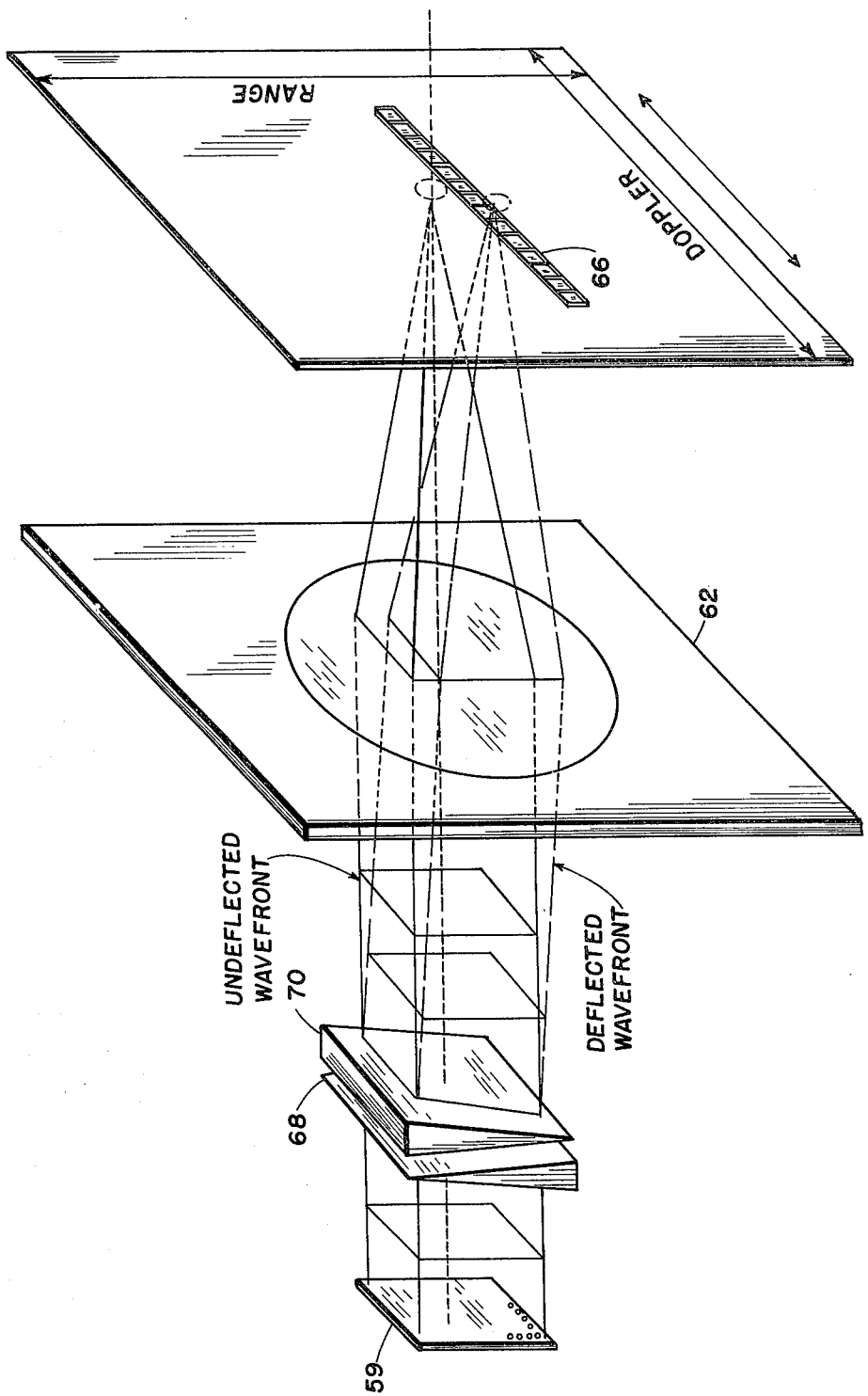
FIG. 5 is a diagrammatic representation showing a modified optical readout section.

As shown in FIG. 5, a compromise between these two extremes may be obtained by using parallel readout sensors 66 on the range axis and sweeping the readout plane past these sensors for searching the Doppler axis, or vice versa. In FIG. 5 two spaced oppositely oriented LiTaO$_3$ deflector prisms 68 and 70 are employed to eliminate the static deflection obtained with a single prism or lens. The prisms 68 and 70 are driven 180° out of phase to obtain double the deflection of a single phase shifter element. Alternatively, a Kerr cell may be used to perform the sweep function in lieu of the LiTaO$_3$ prisms shown in FIG. 5.

As will be obvious, the cost and complexity of the system of the present invention is almost directly proportional to the number of frequencies employed and to the flexibility of frequency selection desired. If a fixed transmit frequency pattern is employed, the masking phase shifter 58 can be eliminated and the masking obtained in the aperture plane. Also, if dynamic switching of transmit pattern is not necessary, selection of transmit patterns can be obtained by mechanical substitution of masks in the aperture plane.

What is claimed is:

1. In combination with a radar having a transmitter section for transmitting a plurality of spaced frequencies during a period of time and a receiver section for processing said transmitted frequencies,
    a hybrid digital-optical radar signal processor including a phase shifter unit having a plurality of crystal phase shifter elements, one of said elements being provided for each frequency processed by said receiver section, means for illuminating the crystal phase shifter elements, a readout plane, means for directing beams emanating from the illuminating means and passing through the crystal phase shifter elements to impinge in a pattern upon the readout plane, and means operatively connecting the radar receiver section to the phase shifter elements, said last mentioned means producing a pattern on said readout plane which will have its maximum intensity at a position in said plane corresponding to the velocity and fine range of a target in the beam of said radar, in the event a coherent return from such a target is present.

2. The combination recited in claim 1, wherein said illuminating means is a laser.

3. The combination recited in claim 1, wherein said beam directing means comprises a pair of spaced focussing lenses, a masking phase shifter unit having a plurality of masking phase shifter elements therein, an aperture plate, and a readout lens.

4. The combination recited in claim 1, wherein the phase shifter elements are each formed of Lithium Tantalate.

5. The combination recited in claim 1, wherein the phase shifter elements are each formed of Potassium Tantalum Niobate.

6. The combination recited in claim 1, wherein said last mentioned means comprises, for each frequency processed by said receiver section, a pair of mixers connected to the receiver section, a reference signal source, a pair of phase shifters, gating means, said phase shifters and gating means being connected between the reference signal source and said mixers, a decoder connected to the mixers, second gating means connected to the decoder, a delay line connected to the second gating means, a digital-analog converter connected to the delay line, and an amplifier connected between the digital analog converter and one of the phase shifter elements.

7. The combination recited in claim 1, wherein the transmitted frequencies are evenly spaced within a predetermined frequency band, and wherein the transmit period is of a predetermined duration.

8. In a hybrid digital-optical radar signal processor, a readout plane, a data plane comprising a phase shifter unit having a plurality of phase shifter elements mounted therein, means for illuminating the phase shifter elements for projecting an image therethrough on the readout plane, and digital means for supplying a signal to the phase shifter elements for varying the image on the readout plane in accordance with a predetermined pattern, said digital means including a digital delay line, a digital-to-analog computer and an amplifier.

9. The invention of claim 8, wherein the phase shifter elements are each formed of Lithium Tantalate.

10. The invention of claim 8, wherein the illuminating means is a laser.

11. The invention of claim 8, including additionally a lens system, a masking phase shifter unit and an aperture plate between the phase shifter elements and the readout plane.

12. The invention of claim 8, wherein the phase shifter elements are each formed of Potassium Tantalum Niobate.

13. In a hybrid digital-optical radar signal processor, a readout plane having a range axis and a Doppler axis, a plurality of parallel readout sensors adjacent the range axis of the readout plane, a readout lens, an aperture plate, and means between the aperture plate and the readout lens for splitting an incident wavefront passing through the aperture plate into deflected and undeflected wavefronts, said readout plane being movable with respect to the sensors for searching the Doppler axis for a target image in said wavefronts.

14. The invention recited in claim 13, wherein the incident wavefront splitting means comprises a pair of spaced prisms driven 180° out of phase.

15. The invention recited in claim 14, wherein said prisms are formed of Lithium Tantalate.

16. The invention recited in claim 14, wherein said prisms are formed of Potassium Tantalum Niobate.

* * * * *